May 28, 1935. P. A. SODERHOLM 2,002,838
BREAD BAKING PAN
Filed May 8, 1934
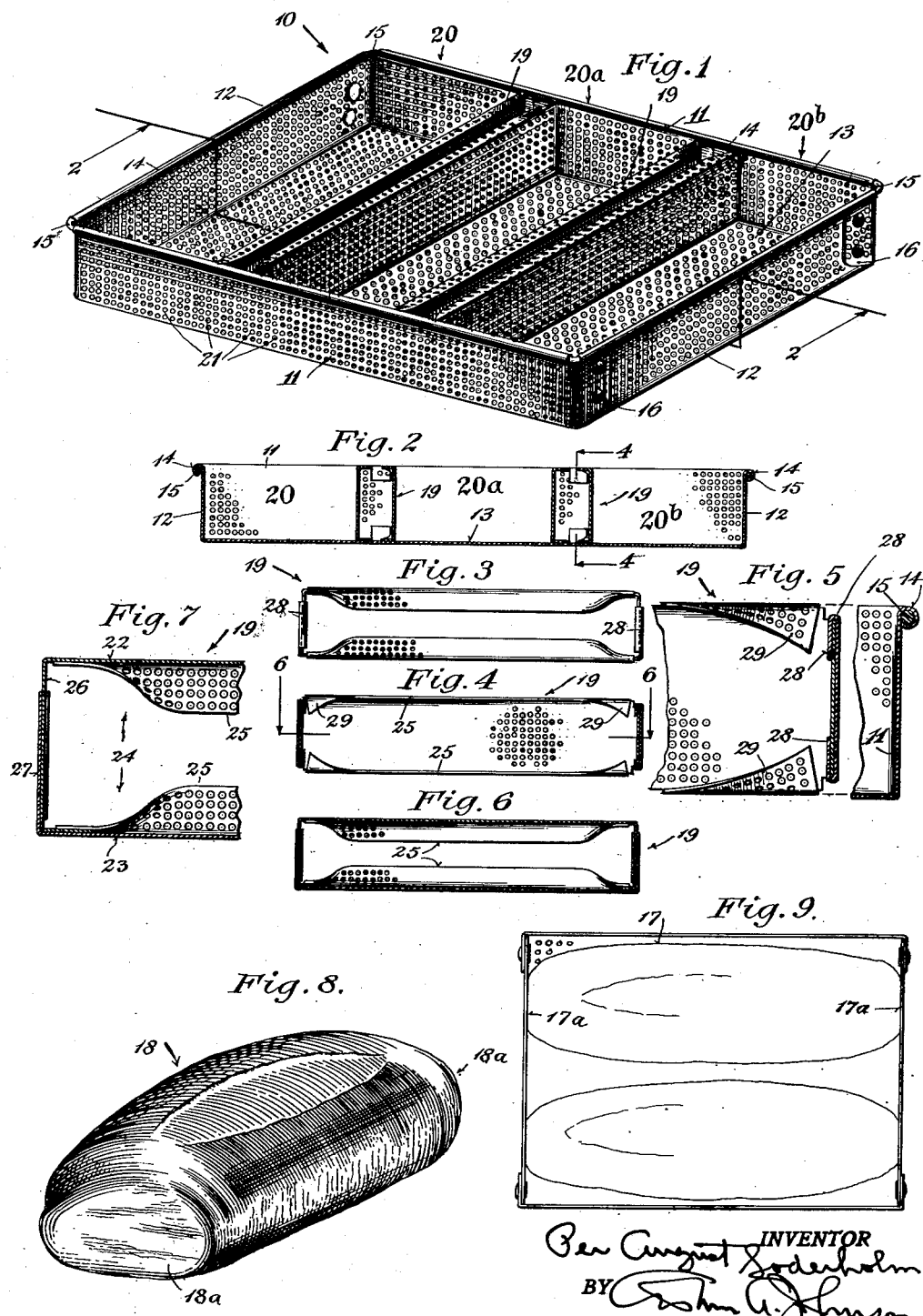

Patented May 28, 1935

2,002,838

UNITED STATES PATENT OFFICE 2,002,838

BREAD BAKING PAN

Per. August Soderholm, Bridgeport, Conn.

Application May 8, 1934, Serial No. 724,493

10 Claims. (Cl. 53—6)

This invention relates to making full-crust or hearth bread.

Heretofore, it was proposed to bake such bread on foraminated trays or shells, but these were substantially flat with sides and ends omitted, evidently in the belief that the latter would prevent the formation of a full-crust at the sides and ends of the loaf.

It is extremely advantageous in bread making to have the ends of the loaves flattened, at least partially, so that when being wrapped with waxed paper, the sealing iron or other pressure-producing device applied to the folded-over ends of the paper at the ends of the loaf may find a flat surface on the bread against which to press the paper. The inability to do this has, heretofore, precluded the use of bread wrapping machinery for full-crust or hearth bread. Besides, to properly wrap the bread, the length of the loaves should be substantially uniform, and this has not been possible to obtain with the use of the trays heretofore proposed.

I have discovered that the ends of a loaf of full-crust or hearth bread may be made flat and the length of the loaf limited and yet produce a satisfactory and sufficiently hard crust all over the loaf by providing a sheet metal pan having a foraminous bottom plate and foraminous walls against which the ends of the dough press when being proofed and baked.

In the form of the invention herein illustrated, the pan is made to hold several formed loaves for proofing and baking, and is made oblong and of such size that three regular small loaves may be baked side by side when arranged transversely of the pan, and two standard size longer and larger loaves may be baked when arranged side by side longitudinally of the pan.

Accordingly, both the long sides and short sides of the pan have the walls foraminated to respectively flatten the ends of and limit the length of short and long loaves.

To insure proper spacing of the three short loaves in the pan, there are provided a pair of partitions or spacing walls fitting in the pan transversely thereof. These are also made of foraminated sheet metal fashioned to form united parallel and spaced strips presented to adjacent sides of adjacent loaves and providing between them space for the circulation of air rising from and over the hearth. These partitions preferably are in the form of substantially rigid frames and self-supporting, so that they may remain in desired position frictionally and of their own weight without screwing or otherwise securing them in place, and so that when removed from the pan they will not easily become damaged.

Other features and advantages will hereinafter appear.

In the accompanying drawing—

Figure 1 is a perspective view of a baking pan for hearth bread made in accordance with the present invention.

Fig. 2 is a longitudinal sectional view of the same, taken on the line 2—2 of Fig. 1.

Fig. 3 is a plan view of one of the partitions used in the pan shown in Fig. 1.

Fig. 4 is a vertical section of the partition taken on the line 4—4 of Fig. 2.

Fig. 5 is an enlarged view of the right hand portion of Fig. 4, showing also a fragment of the pan to indicate the relative height of the partition of the pan.

Fig. 6 is a sectional view taken on the line 6—6 of Fig. 4.

Fig. 7 is a view on an enlarged scale of the left hand side of Fig. 6.

Fig. 8 is a perspective view of a loaf showing its appearance when baked in the pan of the present invention.

Fig. 9 is a plan view of the pan, showing the position of two large loaves which may be baked therein.

As illustrated in the accompanying drawing, the pan 10 of the present invention is oblong in shape and has long sides 11 and short sides 12 around the edges of the bottom 13. The walls or sides 11 and 12 rise perpendicularly to the bottom plate and have their upper ends 14 rolled over a rod or wire 15 to strengthen and stiffen the pan. Preferably, the bottom 13 and sides 11 and 12 are formed from one piece of sheet metal slit in from its edge and having its margins bent up to form the walls 11 and 12, tabs 16 on one set of sides (the sides 11 in the form shown) being folded around and riveted to the other sides (the sides 12).

According to the present invention, the pan 10 may be made of such size as to take only one loaf, but because of the economy in handling several loaves at the same time, it is made of such length that three loaves may be baked side by side and extending transversely of the pan. The length of the pan is such that, as illustrated in Fig. 9, two loaves may be baked side by side and extending longitudinally of the pan. These large loaves 17 are of a standard size and so are the small loaves 18 baked with the pan arranged as shown in Fig. 1.

The pan is divided transversely by partitions 19 so as to make three separate compartments 20, 20a and 20b.

As will be understood from the above, the practical result of the present invention is the making of a full-crusted loaf of bread such as Vienna loaves and such as was heretofore customarily baked directly on the hearth of the oven and yet regulate the length of the loaf or loaves and cause the ends thereof to be at least partially flattened so that bread of this character may be wrapped with waxed paper by bread wrapping machinery, and so that the sealing of the waxed paper folded over the ends of the loaf may be satisfactorily accomplished, the flattened ends of the loaf providing a surface to support the paper when the sealing iron or other pressure-producing means is pressed against the paper and the end of the loaf.

Heretofore it was proposed to bake hearth or full-crust bread on a tray made of foraminated material having relatively shallow cavities to receive the formed dough, the cavities having curved sides intended to aid in the formation of the loaf during proofing and baking.

I have found that shaped batches of dough may be placed on a flat foraminated sheet or plate of metal and that in proofing the loaf will shape up the same as if it had been placed on a peel but with the advantage that the use of cornmeal as a separating and adhesion-preventing medium is unnecessary. In the prior proposal, there were no sides or ends on the tray to limit the dimensions of the loaf in being proofed and baked, evidently because of the belief that such sides and ends would prevent the formation of a hard crust at such places where the dough or baking bread contacted with the sides or plates. The loaves produced, therefore, with the prior proposal, took their natural shape with the pointed and tapering ends which made wrapping the loaves by machinery impractical.

I have discovered that the flat foraminated plate on which the dough and baking loaves rest during the operations of proofing and baking may be provided with walls to limit the dimensions of the loaf and to flatten the ends and yet produce full-crust of satisfactory hardness and texture when these side walls are also foraminated.

I have found that the heat rising from the hearth and the heated atmosphere over the hearth bakes the ends of the bread which contact with the foraminated walls of the pan as hard as though they were not present. While I am uncertain of the reason for this, my observations lead me to the belief that the crust of the ends of the loaf in contact with the side walls 11 or 12, depending on how the loaf is arranged in the pan, is baked hard because the steam and moisture may readily escape from the skin of the loaf and the heated air readily reaching the skin through the foramina of the walls dries out the skin of the loaf and causes it to bake crisp.

Accordingly, in the pan of the present invention as illustrated herein, the bottom, sides and ends are provided with foramina or perforations 21. While considerable variation may be made in the size of the perforations and their closeness, I have found that satisfactory results can be obtained when there are 144 perforations to the square inch, each perforation measuring approximately 3/64 of an inch in diameter. It should be understood, of course, that no attempt has been made, in the accompanying drawing, to show the perforations in proportion to the pan.

When two long loaves are to be baked in the pan, as, for instance, the loaves 17 in Fig. 9, there is no need of a partition or division in the two halves of the pan because the batches of dough may be laid in proper position with no difficulty. However, when three small loaves extending transversely of the pan are to be made, it would be difficult to locate each loaf in its proper position. Accordingly, as shown in the accompanying drawing, the pan of the present invention is provided with partitions 19 extending transversely of the pan. These partitions are also made of foraminated sheet metal and are so formed as to be relatively rigid and self-sustaining as to shape.

The partition is economically and conveniently formed as shown in Figs. 3 to 7 of the accompanying drawing. It is preferably made of two pieces 22 and 23 spaced apart to provide a substantial space 24 between them. The top and bottom of each piece 22 and 23 is folded over to provide a narrow stiffening flange 25. The ends of the strips 22 and 23 at both ends of the partition are bent at right angles, the end 26 on the strip 22 in the form shown lying inside the end 27 of the strip 23. The end 27 has tabs 28 left on it at its top and bottom and these are bent over, around and firmly down upon the end 26 on the piece 22 so as to securely unite the two pieces 22 and 23 together.

The height of the plates or strips 22 and 23 is such that when their tops and bottoms are folded over to provide the flange 25 and the partitions are laid at rest in the pan on the bottom plate 13, the top edge of the partition will be substantially flush with the rolled over top edge 14 of the side walls. When placed in the pan, the partition, being formed of two strips on edge spaced and united together, stands erect without danger of toppling over. The partition is made to fit closely the walls 11 of the pan and the ends 27 of the piece 23 frictionally grip the walls and hold the partition against casual displacement. The foraminated ends of the walls and partition ends aid in this frictional grip between the partition and the side walls of the pan.

To avoid damage or injury being caused by the sharp corners of the flanges 25, the latter are bent down at their ends as illustrated at 29 in Figs. 4 and 5.

The batch of dough is so shaped that when it is placed on the pan for proofing its enlargement in the proofing and its size during baking will not necessarily cause the end walls of the pan or the walls of the partition to be engaged by the dough or baked loaf. Such engagement may from time to time occur, and, should it occur, no deleterious effect is produced, for the portion of the skin or crust contacting with the foraminous side walls or partition walls bake as hard as other portions of the loaf.

The space or chamber 24 between the strips 22 and 23 of the partition permits heat rising from the hearth or in the atmosphere of the oven to reach the sides of the loaves with the result that the loaves are baked just as brown and just as crisp on their sides which face each other in the pan as they are on their sides which are next to the end walls of the pan.

Bread proofed and baked in the pan of the present invention has all the appearances of a loaf baked directly on the hearth, except, for the purposes heretofore referred to, their ends 17a and 18a are flattened, providing a surface against which the waxed paper may be pressed by the sealing iron. Besides, of course, the loaves are all of substantially the same length, being limited in length, by the walls 11 in the case of the small loaves, and the walls 12 in the case of the large loaves, thus further facilitating the wrapping of the loaves and avoiding the necessity of placing the loaves in bags as is now customary for this kind of bread.

Variations and modifications may be made within the scope of this invention and portions of the improvements may be made without others.

Having thus described the invention, what is claimed as new and for which it is desired to obtain Letters Patent, is:—

1. A sheet-metal proofing and baking pan for hearth bread comprising a bottom and a pair of oppositely disposed sides substantially perpendicular to said bottom to flatten the ends of a loaf proofed and baked in said pan and to engage and limit the length of said loaf, the bottom and said sides being foraminated to permit the heat from and over the hearth to bake the crust of the loaf hard all over.

2. A proofing and baking pan for hearth bread comprising a bottom and side and end walls rising perpendicularly therefrom, said pan being oblong and of such size as to hold for proofing and baking a plurality of loaves located side-by-side transversely of the pan, the side walls being adapted to flatten the ends of the loaves and limit the length of the latter, and partitions in the pan extending from the bottom to the level of the tops of the side and end walls to divide the pan into compartments, one for each loaf, said bottom, sides and ends and partitions being foraminated to permit the heat from and over the hearth to bake the crust of the bread hard over the entire surface of the bread.

3. A proofing and baking pan as defined in claim 2, in which the partitions are removably and adjustably mounted in the pan and frictionally engage the side wall to be held thereby against casual movement or removal.

4. A proofing and baking pan as defined in claim 2, in which the partitions have spaced foraminated plates providing between them a substantial space for the purpose specified.

5. A proofing and baking pan as defined in claim 2, in which partitions are removable and the width of the pan is such as to form small loaves when placed transversely of the pan, and the length such as to form large loaves when placed longitudinally of the pan when the partitions are removed.

6. A proofing and baking pan as defined in claim 2, in which the partitions have spaced foraminated plates providing between them a substantial space for the purpose specified, the partition plates having their adjacent ends bent toward each other in overlapping relation and secured together to form a box-like structure.

7. A proofing and baking pan as defined in claim 2, in which the partitions have spaced foraminated plates providing between them a substantial space for the purpose specified, the partition plates having top and bottom flanges bent at right angles to the plates, the bottom flanges engaging the bottom of the pan.

8. A proofing and baking pan as defined in claim 2, in which the partitions have spaced foraminated plates providing between them a substantial space for the purpose specified, the partition plates having their adjacent ends bent toward each other in overlapping relation and secured together to form a box-like structure, and said partition plates having top and bottom flanges bent at right angles to the plates, the bottom flanges engaging the bottom of the pan.

9. A proofing and baking pan as defined in claim 1, in which the bottom and said sides are made of sheet metal having perforations approximately 3/64 of an inch in diameter and spaced so that there are approximately 144 perforations to the square inch.

10. A proofing and baking pan as defined in claim 1, in which the foramina of the bottom and said sides consists of a plurality of relatively closely spaced perforations.

PER. AUGUST SODERHOLM.